(12) United States Patent
Caglayan et al.

(10) Patent No.: US 11,824,370 B2
(45) Date of Patent: Nov. 21, 2023

(54) RETRODIRECTIVE WIRELESS POWER TRANSFER VIA BACKSCATTERING

(71) Applicant: Ossia Inc., Redmond, WA (US)

(72) Inventors: Cosan Caglayan, Bellevue, WA (US); Hatem Ibrahim Zeine, Woodinville, WA (US); Caner Guclu, Bellevue, WA (US); Mehdi Veysi, Bellevue, WA (US)

(73) Assignee: Ossia Inc., Redmond, WA (US)

( * ) Notice: Subject to any disclaimer, the term of this patent is extended or adjusted under 35 U.S.C. 154(b) by 0 days.

(21) Appl. No.: 17/951,573

(22) Filed: Sep. 23, 2022

(65) Prior Publication Data

US 2023/0085960 A1 Mar. 23, 2023

Related U.S. Application Data

(60) Provisional application No. 63/247,365, filed on Sep. 23, 2021.

(51) Int. Cl.
*H02J 50/27* (2016.01)
*H04B 5/00* (2006.01)
*H02J 50/80* (2016.01)

(52) U.S. Cl.
CPC ............. *H02J 50/27* (2016.02); *H02J 50/80* (2016.02); *H04B 5/0037* (2013.01)

(58) Field of Classification Search
CPC ...... H02J 50/20–27; H02J 50/80; H02J 50/90; H04B 5/0037
See application file for complete search history.

(56) References Cited

U.S. PATENT DOCUMENTS

| 9,754,139 B2 | 9/2017 | Chemishkian et al. |
| 2011/0156640 A1* | 6/2011 | Moshfeghi ............ H02J 50/12 320/108 |
| 2015/0091706 A1 | 4/2015 | Chemishkian et al. |

(Continued)

FOREIGN PATENT DOCUMENTS

| KR | 102033595 B1 * | 11/2019 |
| WO | 2021/111934 A1 | 6/2021 |

OTHER PUBLICATIONS

International Application No. PCT/US2022/044538, International Search Report, Written Opinion, 8 pages, dated Jan. 16, 2023.

*Primary Examiner* — Rexford N Barnie
*Assistant Examiner* — David A Shiao

(57) ABSTRACT

Systems and methods are disclosed for wireless power delivery that can provide wireless power, via a retrodirective wireless power transfer (WPT) channel, to a wireless power recipient in response to a modulated backscatter signal from a wireless power receiver. A wireless power receiver can produce a modulated backscatter signal and transmit such to a power delivery system to initiate a wireless power transfer linkage. In some examples, a dual-band technique can be implemented where a first band can be used as a dedicated retrodirective WPT channel while a data communication node can utilize a second band for a low energy compatible data communication type. Both a beacon signal (the backscattered signal) for retrodirective linkage at the first band and the communication signals at the second band can be produced via backscattering at the wireless power receiver. A backscattered beacon signal and a communication signal may be modulated and frequency multiplexed.

21 Claims, 8 Drawing Sheets

(56) References Cited

U.S. PATENT DOCUMENTS

| | | | |
|---|---|---|---|
| 2019/0158341 A1* | 5/2019 | Talia | H04L 27/26 |
| 2019/0214855 A1* | 7/2019 | Abiri | H02J 50/80 |
| 2019/0229770 A1* | 7/2019 | Khaleghi | H04B 5/0031 |
| 2020/0083751 A1* | 3/2020 | Wendt | G06F 1/26 |
| 2020/0169318 A1* | 5/2020 | Kim | H04B 17/309 |
| 2020/0195058 A1* | 6/2020 | Elangovan | G06K 7/10188 |
| 2021/0036538 A1 | 2/2021 | Maniktala | |
| 2021/0119726 A1 | 4/2021 | Kim et al. | |
| 2021/0143678 A1 | 5/2021 | Georgakopoulos | |
| 2022/0131424 A1* | 4/2022 | Charthad | H02J 50/15 |
| 2022/0158496 A1* | 5/2022 | Tanaka | H02J 7/0029 |
| 2022/0335234 A1* | 10/2022 | Moreno Levy | H02J 50/20 |
| 2023/0014594 A1* | 1/2023 | Lee | H02J 50/20 |
| 2023/0068701 A1* | 3/2023 | Tanaka | H02J 50/40 |

\* cited by examiner

RETRODIRECTIVE WIRELESS POWER TRANSFER VIA BACKSCATTERING

CROSS-REFERENCE TO RELATED APPLICATIONS

This application claims priority to U.S. Provisional Patent Application No. 63/247,365 filed on Sep. 23, 2021, which is incorporated herein by reference in its entirety.

BACKGROUND

Wireless power may be delivered via multiple different technologies, such as induction and magnetic resonance, ultrasound, laser, or radio frequency (RF). Induction and magnetic resonance are used in wireless charging cradles and pads; however, the power receiving device has to be in close proximity to the charger. An induction-based system can be a little more forgiving than magnetic resonance, which requires more precise placement of the power receiving device in relation to the charger. However, induction and magnetic resonance both do not allow for practical and comfortable use or movement of devices while charging. Ultrasound based power delivery systems allow for a lot of power, such as enough to charge a laptop, at moderate range. However, ultrasound-based wireless power solutions require a 1-to-1 configuration of wireless charger to receiving product, which leads to a very inefficient way to deliver power. Lasers can be used to deliver wireless power at a few hundred feet; however, the power receiving device must be in the line of sight of the charger and as such is only practical for products that are fixed in position and mounted out of the way because of potential safety issues with the lasers.

RF-based wireless power solutions can use beamforming to provide power to a power receiving device. Such solutions can also use reflective paths to steer around objects to deliver power, making the technology both efficient and safe. Thus, an RF-based wireless power transfer (WPT) system can deliver energy wirelessly, without the need for pad chargers, line of sight, or plugging in, to one or more electronic devices, which can be especially useful to sustainably power Internet-of-Things (IoT) devices in real-time.

Some RF-based WPT systems can accomplish wireless power delivery via the use of a low signal beacon transmitted from a power receiver device that illuminates the paths available for RF signals from the power receiver device to the power transmitter device. Because RF signals can travel both ways, this ensures that the signals going from the power transmitter device can follow the same paths back to the power receiver device. This process can be repeated many times per second to ensure that the RF signals are always tracking away from any objects or people in the environment and always targeting the power receiver device.

However, to achieve such, wireless charging of electronic devices utilizing RF signals and beacons typically require integrated circuit (IC) transceivers at both the power receiver device and the power transmitting device. Such IC transceivers can add size, weight, power consumption, and cost to each device; thus, systems with IC transceivers have a higher cost, higher weight, more complexity, and consume more power resources. For at least these reasons, there is a need for a new wireless power delivery system that addresses these issues. The embodiments described herein provide solutions to these problems.

SUMMARY

In certain embodiments, an apparatus may comprise a wireless power receiver circuit configured to receive a power delivery signal from a wireless power transmitter system. The wireless power receiver circuit can include a beacon signal generator circuit configured to generate a beacon signal by capturing an incoming discovery/activation signal from the wireless power transmitting system and re-radiating/scattering by intentional modulation applied thereon. This signal is a modulated backscattered beacon signal realized through a modulation circuit configured to modulate the discovery signal to generate the intended modulation scheme in backscattering; and an output configured to provide the modulated backscattering signal to be transmitted to the wireless power transmitting system.

In certain embodiments, a device may comprise a wireless power transmission system. The wireless power transmission system may include a transmitter circuit couplable to an antenna; a receiver circuit couplable to the antenna; and a control circuit. The control circuit may be configured to send a backscatter activation signal via the transmitter circuit; receive a beacon signal, via the receiver circuit, from a wireless power client in response to the backscatter activation signal; and transmit a wireless power signal, via the transmitter, to the wireless power client in response to the beacon signal.

In certain embodiments, a method can comprise receiving, at a wireless power receiver, an interrogation signal; powering the wireless power receiver by the discovery/interrogation signal; transmitting, from the wireless power receiver, a beacon signal generated by modulation of the interrogation signal; and receiving, at the wireless power receiver, a wireless power signal in response to the beacon signal.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, system-on-chip (SoC), circuit logic, and other hardware devices can likewise be constructed to implement the circuits, functions, processes, and methods described herein. Methods and functions may be performed by modules or engines, both of which may include one or more physical components of a computing device (e.g., logic, circuits, processors, controllers, etc.) configured to perform a particular task or job, or may include instructions that, when executed, can cause a processor to perform a particular task or job, or may be any combination thereof. Further, the methods described herein may be implemented as a computer readable storage medium or memory device including instructions that, when executed, cause a processor to perform the methods.

Figure 1:
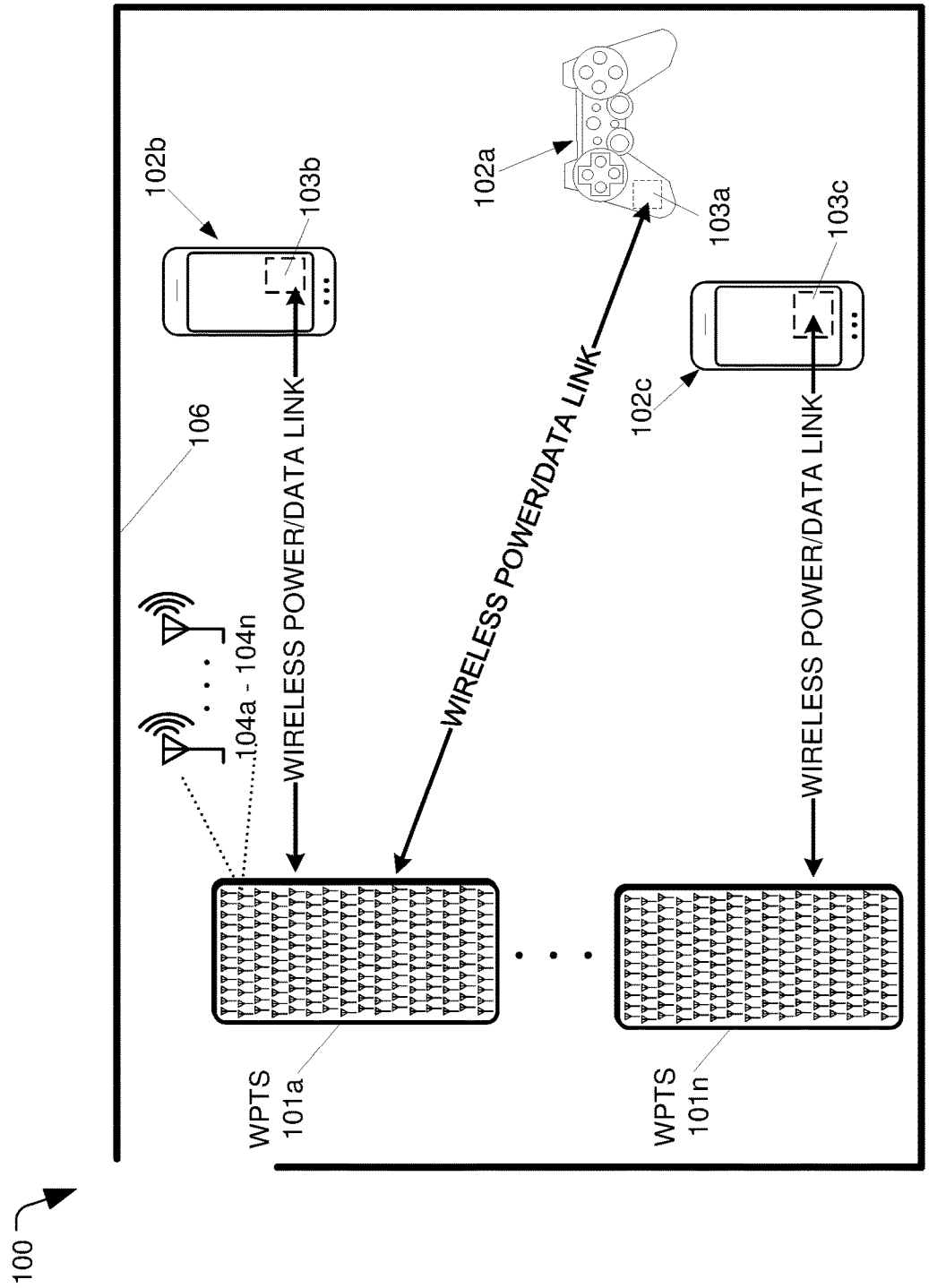
FIG. 1 is a block diagram of a wireless power delivery environment, in accordance with certain embodiments of the present disclosure.

Referring to FIG. 1, a block diagram of a wireless power delivery environment is shown and generally designated 100. The environment 100 can provide wireless power delivery from one or more wireless power transmission systems (WPTS) 101a-n (also referred to as "wireless power delivery systems", "antenna array systems" and "wireless chargers") to various wireless devices, such as device 102a, 102b, or 102c within the wireless power delivery environment 100, that have one or more wireless power transfer circuits 103a, 103b, or 103c (also referred to herein as a "client", "wireless power receiver", and the plural variations thereof). The wireless power receivers are configured to receive and process wireless power from one or more wireless power transmission systems 101a-101n. Components of an example wireless power receiver 103 are shown and discussed in greater detail with reference to FIGS. 3 and 4.

The wireless power transfer circuits 103a, 103b, and 103c can be implemented without a need for a transceiver integrated circuit, such as disclosed and discussed herein. For example, as detailed in certain embodiments herein, a circuit can be implemented that does not utilize a conventional transceiver integrated circuit; instead, the power transfer circuits 103a, 103b, and 103c can be implemented as a circuit not having a transceiver. Thus, the power transfer circuits 103a, 103b, or 103c can allow a receiver system to be built at a much cheaper cost, with less circuit complexity, and will utilize less power consumption, which are all key benefits for many Internet-of-Things devices and applications.

As shown in the example of FIG. 1, the wireless devices 102a-102n may include devices such as mobile phones or wireless game controllers. Further, the wireless devices 102a-102c can be any device or system that can receive power via a wireless power receiver (such as 103a, 103b, or 103c).

Each wireless power transmission system 101 can include multiple antennas 104a-n (e.g., an antenna array including hundreds or thousands of antennas), which are capable of delivering wireless power to wireless devices 102a-102c. In some embodiments, the antennas are adaptively-phased RF antennas. The wireless power transmission system 101 is capable of determining the appropriate phases with which to deliver a coherent power transmission signal to the wireless power receivers 103a-103c. The array is configured to emit a signal (e.g., continuous wave or pulsed power transmission signal) from multiple antennas at a specific phase relative to each other. It is appreciated that use of the term "array" does not necessarily limit the antenna array to any specific array structure. That is, the antenna array does not need to be structured in a specific "array" form or geometry. Furthermore, as used herein the term "array" or "array system" may include related and peripheral circuitry for signal generation, reception, and transmission, such as radios, digital logic, and modems. In some embodiments, the WPTS 101 can have an embedded Wi-Fi hub for data communications via one or more antennas or transceivers.

As illustrated in the example of FIG. 1, WPTS 101a-101n can each have multiple power delivery antennas, such as power deliver antennas 104a-104n in WPTS 101a. The power delivery antennas 104a can be configured to provide delivery of wireless radio frequency (RF) power in the wireless power delivery environment 100. In some embodiments, one or more of the power delivery antennas 104a-104n can alternatively or additionally be configured for data communications in addition to or in lieu of wireless power delivery. The one or more data communication antennas can be configured to send data communications to and receive data communications from the wireless power receivers 103a-103c, the wireless devices 102a-102c, or a combination thereof. Such data communications may be implemented via any wireless data communication technology.

Each wireless power receiver 103a-103c can include one or more antennas (not shown) for receiving signals from the wireless power transmission systems 101a-101n. Likewise, each wireless power transmission system 101a-101n includes an antenna array having one or more antennas or sets of antennas capable of emitting continuous wave or discrete (pulse) signals at specific phases relative to each other. Each of the wireless power transmission systems 101a-101n is capable of determining the appropriate phases for delivering the coherent signals to the wireless power receivers 102a-102c. For example, in some embodiments, coherent signals can be determined by computing the complex conjugate of a received beacon (or calibration) signal at each antenna of the array such that the coherent signal is phased for delivering power to the particular wireless power receiver that transmitted the beacon (or calibration) signal.

Although not illustrated, each component of the environment, e.g., wireless device, wireless power transmission system, etc., can include control and synchronization mechanisms, e.g., a data communication synchronization module. The WPTS 101a-101n can be connected to a power source such as, for example, a power outlet or source connecting the wireless power transmission systems to a standard or primary AC power supply in a building. Alternatively, or additionally, one or more of the WPTS 101a-101n can be powered by a battery or via other mechanisms, e.g., solar cells, etc.

The wireless power receivers 102a-102c and the wireless power transmission systems 101a-101n can be configured to operate in a multipath wireless power delivery environment 100. That is, the wireless power receivers 102a-102c and the WPTS 101a-101n can be configured to utilize a reflective object(s) 106 such as, for example, walls or other RF reflective obstructions within range to transmit beacon (or calibration) signals, receive wireless power, or receive data within the wireless power delivery environment 100. The reflective object(s) 106 can be utilized for multi-directional signal communication regardless of whether an object is blocking the line of sight between a WPTS 101 and the wireless power receivers 103.

As described herein, each wireless device 102a-102c can be any system, device, or any combination thereof that can establish a connection with another device, a server, or other systems within the environment 100. In some embodiments, the wireless devices 102a-102c can include displays or other output functionalities to present data to a user, include input functionalities to receive data from the user, or both. By way of example, a wireless device 102 can be, but is not limited to, a video game controller, a server, a desktop computer, a computer cluster, a mobile computing device such as a notebook, a laptop computer, a handheld computer, a mobile phone, a smart phone, or similar. By way of example and not limitation, the wireless device 102 can also be any wearable electronic device such as a watch, necklace, ring, or other electronic device embedded on or within a customer. Other examples of a wireless device 102 include, but are not limited to, safety sensors (e.g., fire or carbon monoxide), electric toothbrushes, electronic door locks and handles, electric light switch controllers, electric shavers, etc.

The WPTS 101 and the wireless power receivers 103a-103c can each include a data communication module for communication via a data channel. Alternatively, or additionally, the wireless power receivers 103a-103c can direct the wireless devices 102a-102c to communicate with the wireless power transmission system via a respective data communication module.

The wireless power receivers 103a-103c can implement a dual-band technique where a first band can be used as a dedicated retrodirective wireless power transfer (WPT) channel while a second band can be used as a communication channel. For example, a communication channel (node) can implement a low energy compatible communication type, such as Bluetooth Low Energy (BLE). Both a beacon signal for a retrodirective linkage at the first band and the communication signals at the second band can be produced via backscattering as opposed to via a transceiver integrated circuit(s). These methods and systems of frequency multiplexing of backscattered power harvesting and communication functions allow interference-free operation of the proposed low power communication node while ensuring reliable wireless power delivery. Example embodiments and implementations of such are provided herein.

Figure 2:
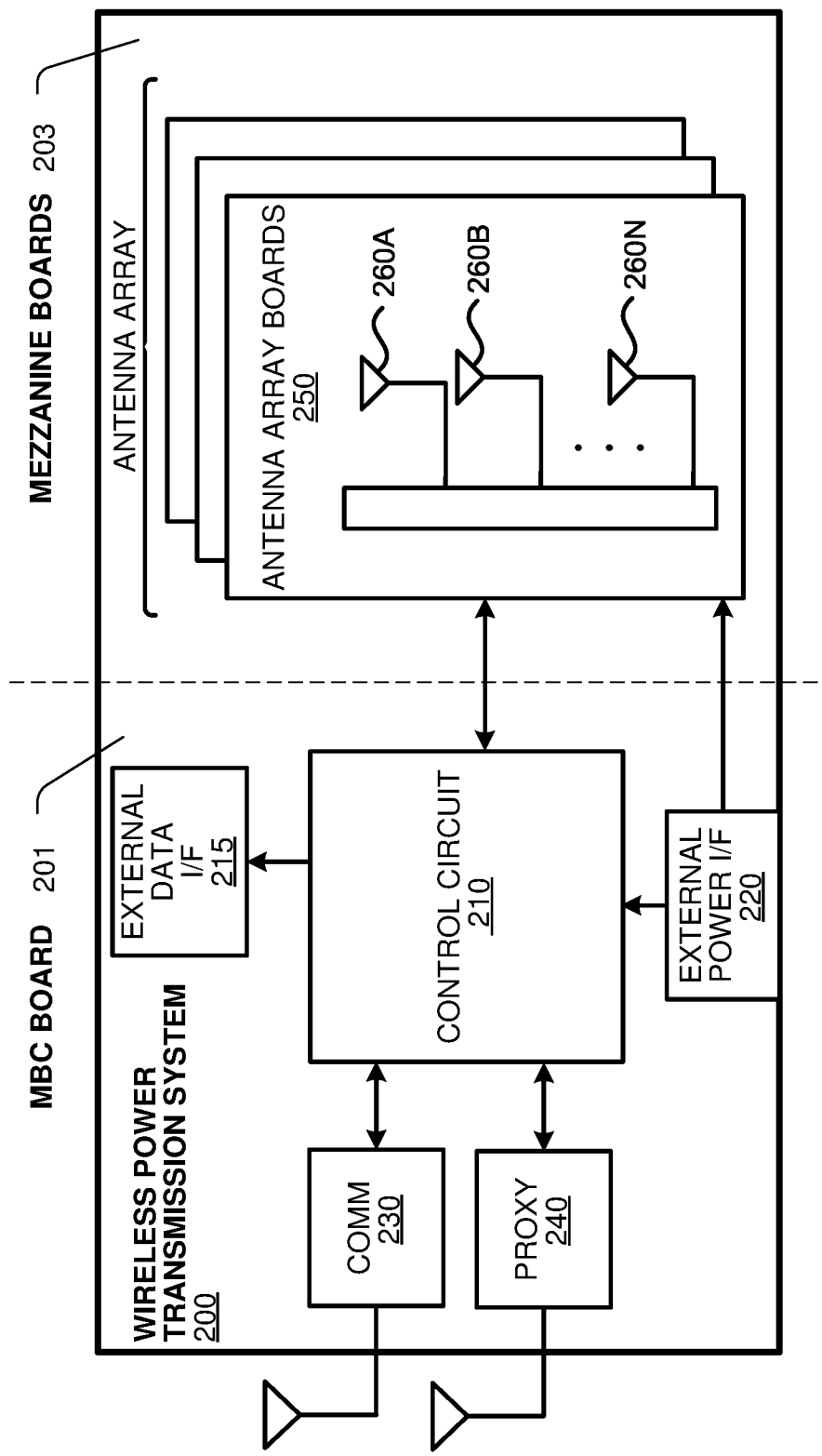
FIG. 2 is a block diagram of a wireless power transmission system, in accordance with certain embodiments of the present disclosure.

FIG. 2 depicts a block diagram of a wireless power transmission system 300, in accordance with certain embodiments of the present disclosure. The wireless power transmission system 200 may also be referred to as a wireless power delivery system. The wireless power delivery system 200 can include one or more circuit boards, such as printed circuit boards (PCBs), which may include a master bus controller (MBC) board 201 and multiple mezzanine boards 203 that include the antenna array boards 250. The MBC board 201 can include control circuit 210, an external data interface (I/F) 215, an external power interface (I/F) 220, a communication block 230 and proxy 240. The mezzanine boards 203 (or antenna array boards 250) can each include multiple power transmission antennas 260A-260N. Some or all of the components of MBC board 201 or the mezzanine boards 203 can vary in quantity or be omitted in some embodiments; further, additional components can also be added. For example, in some embodiments only one of communication block 230 and proxy 240 may be included.

The control circuit 210 can be implemented via hardware circuits, logic circuits, software, or any combination thereof, and can be configured to provide control and intelligence to the components of the MBC board 201 as well as to the mezzanine boards 203. The control circuit 210 may include one or more processors, field programmable gate arrays (FPGAs), memory units, interface circuits, etc., and may direct and control the various data and power communications capabilities of the wireless power delivery system 200. The communication block 230 can direct data communications on a data carrier frequency, such as a base clock signal for clock synchronization. Likewise, the proxy block 240 can communicate with clients via data communications as discussed herein. In certain embodiments, any of the data communications herein can be implemented via any short-range wireless technology, such as Bluetooth™, Wi-Fi™, ZigBee™, etc., including combinations or variations thereof. In further embodiments, the data communications can be implemented via a low-power communication protocol, low-bandwidth communication protocol, or a protocol providing both low-power and low-bandwidth.

In some embodiments, the control circuit 210 can also facilitate or otherwise enable data aggregation for devices, such as for Internet of Things (IoT) devices. In some embodiments, wireless power receivers can access, track, or otherwise obtain IoT information about the device in which the wireless power receiver is embedded and provide that IoT information to the wireless power transmission system 300 over a data connection. This IoT information can be provided to a data collection system (not shown), which may be local or server-based on an intranet (e.g., private network) or extranet (e.g., internet cloud-based), via the external data interface 215, where the data can be aggregated, processed, or otherwise utilized. For example, the data collection system can process the data it receives to identify trends across various factors, such as geographies, wireless power transmission systems, environments, devices, etc. In some embodiments, the aggregated data or trend data determined from the aggregated data can be used to improve operation of the devices via remote updates or other updates. Alternatively, or additionally, in some embodiments, the aggregated data can be provided to third party data consumers. In a specific example, the wireless power transmission system can act as a gateway or enabler for IoT devices; the IoT information could include information regarding capabilities of the device in which the wireless power receiver is embedded, usage information of the device, power levels of the device, information obtained by the device or the wireless power receiver itself (e.g., via sensors, etc.), or any combination thereof.

The external power interface 220 can be configured to receive external power and provide the power to various components of the wireless power delivery system 200. In some embodiments, the external power interface 220 may be configured to receive an external direct current (DC) power supply. In other embodiments, the external power interface 220 can receive alternating current (AC) power and convert it to DC power via an embedded AC/DC converter circuit. Alternative configurations are also possible based on the power requirements of the wireless power delivery system 200.

In operation, the MBC board 201 can control the wireless power transmission system 200 when it receives power from a power source and is activated. The MBC board 201 may then activate one or more of the power transmission antenna elements 260A-260N, where the activated power transmission antenna elements 260A-260N can enter a default discovery mode to identify available wireless power receivers (e.g., 103a, 103b, or 103c) within range (e.g., an effective operable distance) of the wireless power transmission system 200. When a wireless power receiver is found, the activated antenna elements 260A-260N can power on, enumerate, and (optionally) calibrate. The control circuit 210, another circuit within the MBC board 201, or a combination thereof may determine when a backscatter signal is detected from a receiver device. For example, a detection circuit or module of the MBC board 201 can detect a backscatter signal by monitoring for a modulated signal that has a unique signature in time or frequency. The detection circuit or module MBC board 201 may be able to recognize a specific backscatter signal and initiate a process in response thereto, such as discussed below.

The MBC board 201 can generate a discovery signal via the antenna array boards 250. The discovery signal may also be referred to as an activation signal or interrogation signal. In some embodiments, the discovery signal can be a pulse train modulated signal or a low-level interrogation signal. Generally, the discovery signal questions (or interrogates) the space for receivers, and a receiver within the space may answer (or reply) via a modulated backscatter signal.

The WPT system 200 can monitor one or more antennas, such as the antennas 260A-260N or a dedicated antenna, to detect a reflected, modulated backscatter signal from a client device. Note that until a modulated signature is created at the client device via backscattering, it is not straight forward for the WPT system 200 to separate signals from client devices, or even detect the presence of one. Once a reflected, modulated backscatter signal is received, the control circuit 210 can determine if the received signal includes a data communication component, a beacon component, or both. When a data communication component is present, the control circuit 210 may decode the communication portion of the signal and process the data. In some examples, the data provided by the communication portion of the signal may be system level monitoring data (e.g., energy storage level, etc.) or may be data related to the purpose of the receiver device (e.g., sensor data or data about an IoT device). The control circuit 210 may determine a range (e.g., distance from circuit 210) and location of a client device, such as by performing phase data extraction from the beacon component. For example, the WPT system 200 may implement a phase-based determination system such as described in U.S. Pat. No. 10,396,602 or 10,447,092, which are incorporated by reference herein in their entireties. In some embodiments, the backscattered beacon signal received by the transmitter 200 can be used for range detection and localization of the client by extracting the unwrapped phase of the backscattered beacon signal. Based on the range and location of the client, the control circuit 210 can establish a wireless power delivery to the client via a dedicated, retrodirective linkage channel using one or more of the antennas 260A-260N.

In some embodiments, a proxy antenna element 240 can broadcast the discovery signal to clients within a certain range. As discussed herein, the discovery signal can indicate to a client that wireless power delivery is available.

Figure 3:
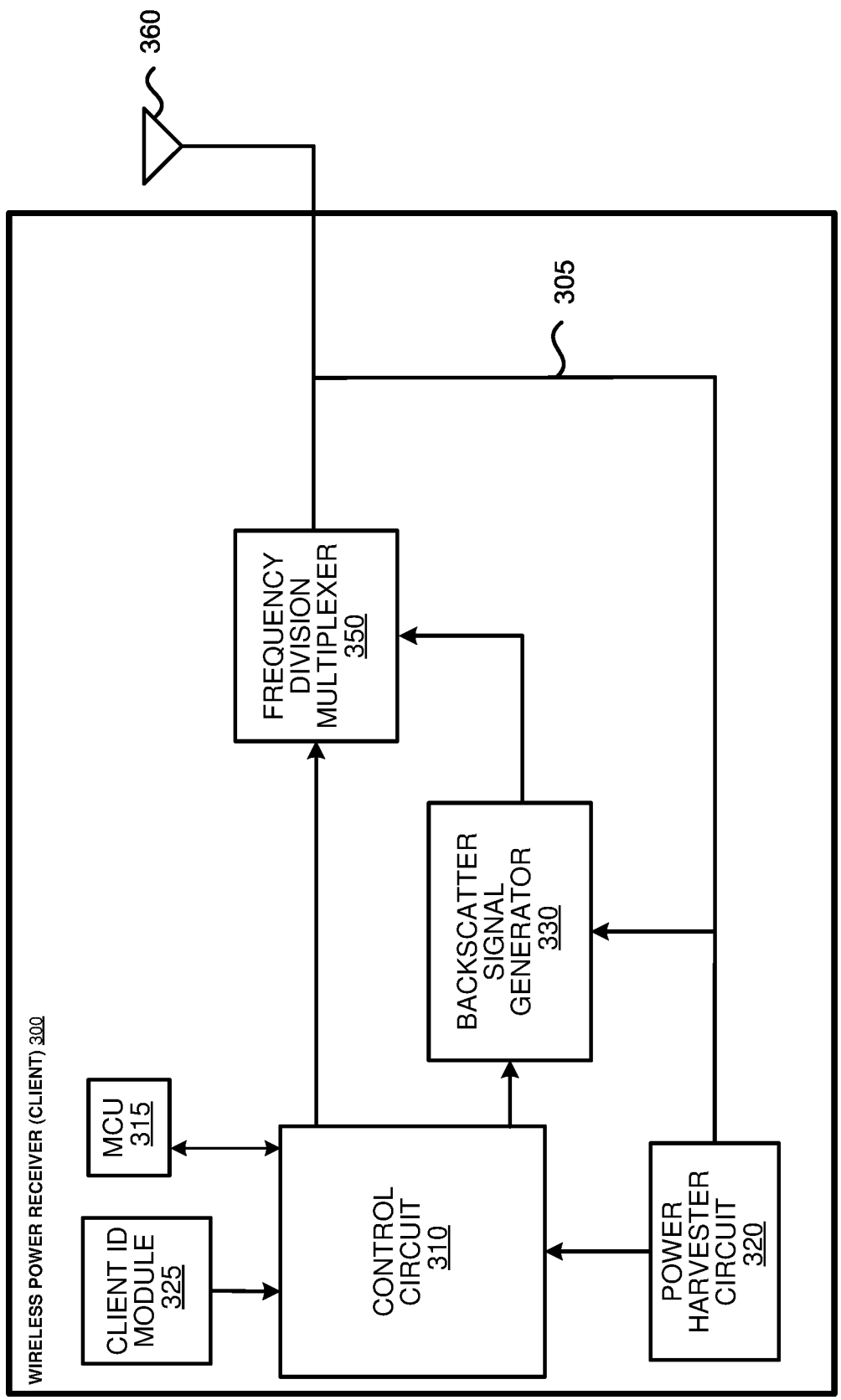
FIG. 3 is a block diagram of a wireless power receiver, in accordance with certain embodiments of the present disclosure.
Figure 4:
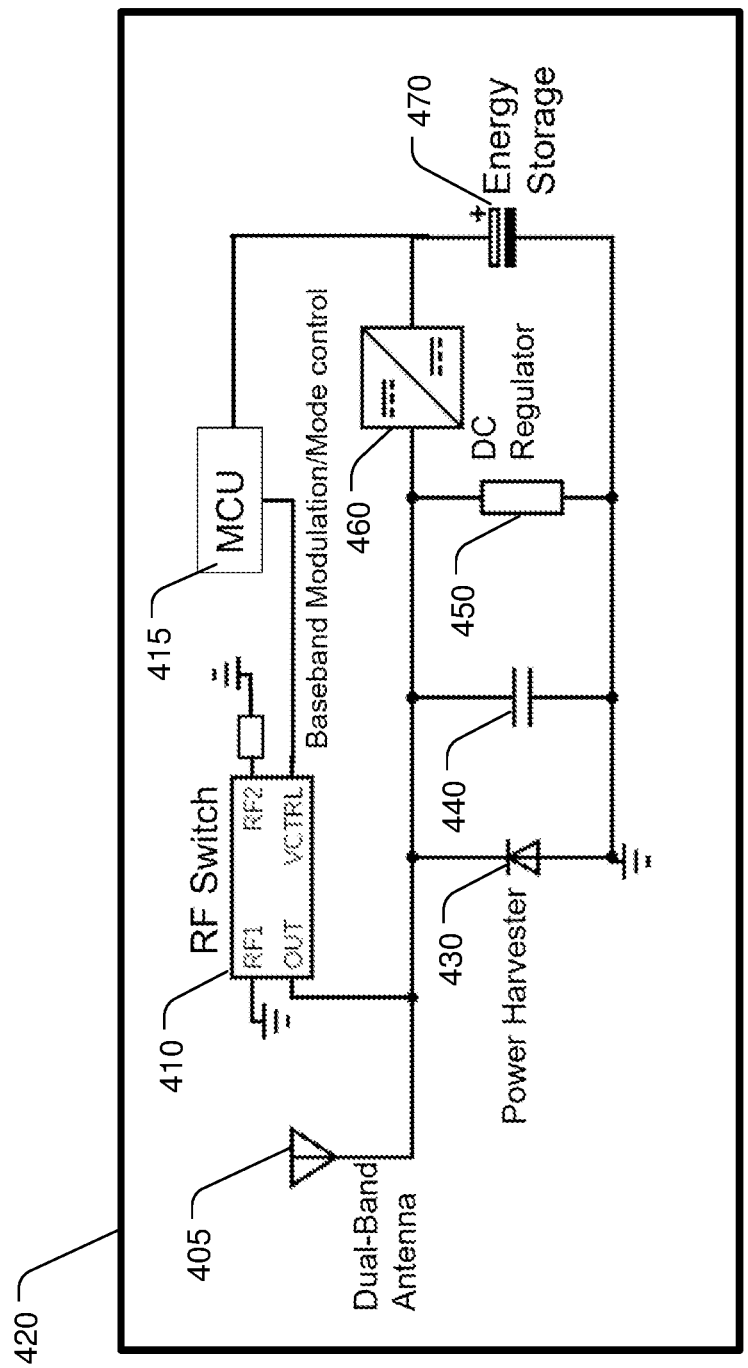
FIG. 4 is a circuit diagram of a wireless power receiver circuit, in accordance with certain embodiments of the present disclosure.

FIG. 3 depicts a block diagram of a wireless power receiver 300, in accordance with certain embodiments of the present disclosure. The receiver 300 can include a control circuit 310, a microcontroller unit (MCU) 315, a client identification (ID) module 325, a backscatter beacon signal generator circuit 330 (such as shown in FIG. 4), a frequency division multiplexer circuit 350, and an associated antenna 360. Further, the wireless power receiver 300 can include a power harvester circuit 320. The antenna 360 may be a dual-band antenna or may include more than one antenna. In various embodiments, additional components may be included, some of the components may be combined, or some of the components can be omitted; for example, the wireless power receiver 300 may not include its own antennas (e.g., antenna 360) but instead utilizes or otherwise shares one or more antennas (e.g., Wi-Fi antenna) of the wireless device in which the wireless power receiver 300 is embedded. Even further, in some embodiments, the wireless power receiver 300 may include a single antenna (e.g., a dual-band antenna) that provides data transmission functionality as well as power and data reception functionality.

During operation, the power harvester circuit 320 can passively monitor for detection of a discovery signal, such as via antenna 360, from a power transmitting system. The power harvester circuit 320 may accumulate power from the discovery signal and the control circuit 310, MCU 315, or a combination thereof may monitor the power to determine when there is enough accumulated power to perform certain functions. For example, the control circuit 310 may monitor for when there is enough power to operate the MCU 315, which may control modulation of the beacon signal, the communication signal, or both. When there is not enough power, the control circuit 310 may wait until enough power is received to perform certain functions; examples of such are provided with respect to FIG. 7.

Once there is enough power to operate certain circuits, the control circuit 310 may operate the backscatter beacon signal generator circuit 330, the frequency division multiplexer circuit 350, or a combination thereof. In some embodiments, the control circuit 310 may utilized the MCU 315 to create the modulated backscatter beacon signal, the backscatter communication signal, or both, such as when an embodiment utilizes the frequency division multiplexer 350 to combine the backscatter beacon signal and the backscatter communication signal. For example, the MCU 315 may control the modulation by providing MCU control signals to a RF switch, such as shown in FIG. 4, or other circuitry to generate a modulated signal. Further, the MCU 315, the control circuit 310, or a combination thereof may include a low-energy circuit (e.g., a discrete circuit, a microprocessor, programmable logic, or a circuit within an application specific integrated circuit (ASIC)) that can trigger the modulation circuitry even in receipt of low power without the need to energize all the circuits or functionality within the client 300, such as other circuits within MCU 315 and control circuit 310. The backscatter beacon signal and the backscatter communication signal may be transmitted (e.g., re-radiated) to a power delivery system via the antenna 360. In some examples, the beacon signal may be described as being radiated from a WPTS, such as WPTS 200, and the backscattered beacon signal may be described as being re-radiated from the receiver 300.

In some embodiments, the control circuit 310 can communicate with or otherwise derive device information (e.g., IoT information, client ID, or a power urgency indicator) from the device in which the wireless power receiver 300 is embedded. Although not shown, in some embodiments, the wireless power receiver 300 can have one or more data connections (wired or wireless) with the device in which the wireless power receiver 300 is embedded over which device information can be obtained. Alternatively, or additionally, device information can be determined or inferred by the wireless power receiver client 300 (also referred to herein as wireless power client 300 or wireless power receiver 300); for example, via one or more sensors. The device information can include, but is not limited to, information about the capabilities of the device in which the wireless power receiver 300 is embedded, usage information of the device, power levels of the battery or batteries of the device, information obtained or inferred by the device, or any combination thereof.

In some embodiments, a client identification (ID) module 325 can store a client ID that can uniquely identify the wireless power receiver 300 in a wireless power delivery environment. For example, the client ID can be transmitted to one or more wireless power transmission systems when communication is established. In some embodiments, a wireless power receiver 300 may be able to receive and identify one or more other wireless power receivers in a wireless power delivery environment based on respective client IDs.

FIG. 4 depicts a circuit diagram of a wireless power receiver circuit 420, in accordance with certain embodiments of the present disclosure. The wireless power receiver circuit 420 can be an example implementation of each of the wireless power receivers 103*a*-103*c* and the power harvester circuit 320. The wireless power receiver circuit 420 can include a radio frequency (RF) switch 410, a diode 430 (which may also be referred to as a rectifier diode), capacitor 440, load 450 (e.g., a variable load or other circuit), a DC regulator 460, and energy storage circuit 470 (e.g., a capacitor or similar). The MCU 415 may be located external to circuit 420, such as within a separate control circuit like the MCU 315, where circuit 420 may correlate to control circuit 310, in some embodiments. In some embodiments, the energy storage 470 may be a polarized electrolytic capacitor. Antenna 405 may connect to an input of circuit 420; in some embodiments, the antenna 405 may be a dual-band antenna.

During operation, the antenna 405 can receive an interrogation signal broadcast from a wireless power transmission system, such as WPTS 200 or WPTS 101*a*-101*n*. The interrogation signal may be received by antenna 405 where the interrogation signal provides power to activate at least a portion of circuit 420. Once the circuit 420 has received enough power, the RF switch 410, or an equivalent switch-like circuit, may be activated to provide a modulated signal, via antenna 405, back to the wireless power transmission system that transmitted the interrogation signal by simply modulating and re-broadcasting the incident interrogation signal. The RF switch or switch-like circuits 410 may be controlled by the MCU 415 and may tune the antenna 405, thereby creating a modulated signal. The modulated signal may then be a re-transmitted, effectively being a modulated backscattered version of the interrogation signal and may provide phase information to the wireless power transmission system. The MCU 415 may control the modulation of the reflected backscatter signal via a voltage control (VC-TRL) input to the RF switch 410.

Once the wireless power transmission system (e.g., base station) receives the modulated backscattered signal, the wireless power transmission system may extract the phase information from the signal and transmit a power delivery signal to the circuit 420 based on the phase information. The power delivery signal may also be received at the antenna 405, or another antenna, and may be rectified via the diode 430 and capacitor 440 to provide power to circuit 420 via a voltage over the load 450. The voltage over the load 450 can provide a charge to the energy storage element 470, which could be a battery, a supercapacitor, or equivalent, which may be regulated via the DC regulator 460 to maintain a desired voltage level applied to the energy storage element 470.

Circuit 420 is an example circuit that can establish a retrodirective linkage with a wireless power delivery transmission system at a first band. In addition, circuit 420 can provide communication signals at a second band utilizing antenna 405, which can also be produced via backscattering. RF switch 410, or another switch-like circuit, can be controlled by MCU 415 to produce the modulated signal. In some embodiments, RF switch 410 may not be active by default, allowing the circuit 420 to conserve power while it receives and harvests any signals of opportunity to increase the amount of energy stored in energy storage 470. In some cases, power transmitters can perform sweeps to allow receivers with insufficient energy to collect energy this way to turn back on again. RF switch 410 can be activated when the MCU 415 wants to send a backscattered signal by modulating it via tuning the antenna 405. This modulated signal is re-radiated back to the sender, effectively creating the modulated backscatter signal that will send the transmitter the phase information. This type of modulated backscattering can be also used to transmit data as well.

Figure 5:
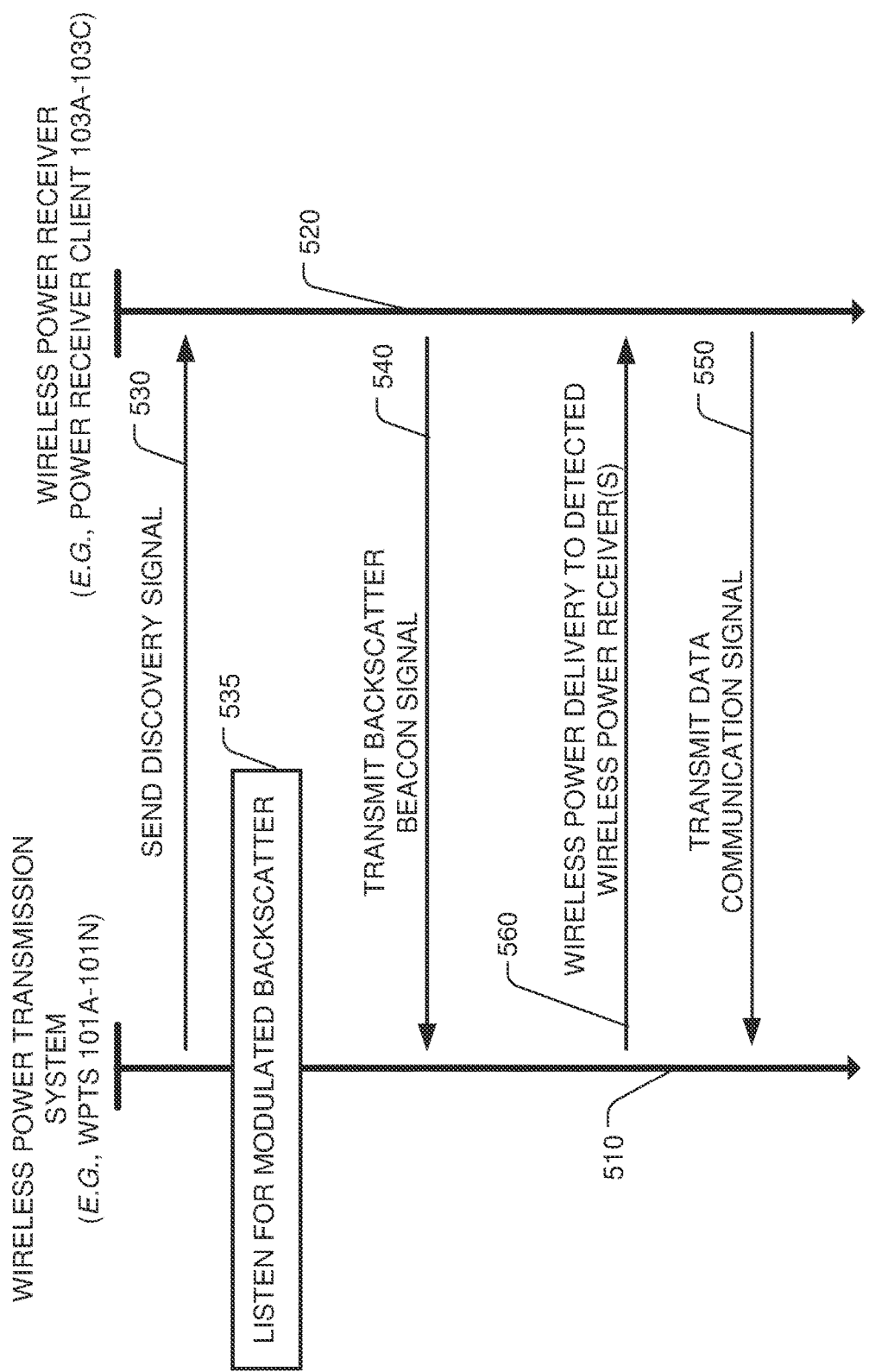
FIG. 5 is a sequence diagram illustrating example operations between a wireless power transmission system and a wireless power receiver, in accordance with certain embodiments of the present disclosure.

FIG. 5 depicts a sequence diagram illustrating example operations between a wireless power transmission system 510 (e.g., WPTSs 101*a*-101*n*) and a wireless power receiver 520 (e.g., wireless power receivers 103*a*-103*c*), in accordance with certain embodiments of the present disclosure. Initially, communication can be established between the wireless power transmission system 510 and the wireless power receiver 520 via a discovery signal 530. The discovery signal 530 may be a pulse interval modulated signal that can provide power to the wireless power receiver 520. The WPTS 510 may then listen for a response from a client, which may include monitoring for a modulated backscatter signal, at 535.

Once the wireless power receiver 520 receives the discovery signal, the wireless power receiver 520 may send back a modulated backscatter beacon signal 540, a data communication signal 550, or both, depending on the energy storage level. The WPTS 510 may receive the transmitted signal(s) from the wireless power receiver 520 and, in response thereto, provide a wireless power delivery signal 560 to the wireless power receiver 520. In some embodiments, the data communication signal 550 may be sent to the WPTS 510 after wireless power has been delivered to the receiver 520, as shown in FIG. 5. The wireless power delivery signal 560 may be provided via retrodirective linkage at a first band and the data communication signal may be provided at a second band, which both may be sent or received via a dual-band antenna. The wireless power delivery signal 560 may be based on a range and location determined from the modulated backscatter beacon signal 540 by the WPTS 510. In some examples, the WPTS 510 may determine a range and localization of the wireless power receiver 520 based on extracting the unwrapped phase of the modulated backscatter beacon signal 540.

The backscattered signal received by transmitter 510 can be used for range detection and localization of the receiver 520. The backscattered signal phase data entropy should be larger than an independent active beacon, since it contains two-way propagation information. Further, a large aperture of the transmitter 510 can also enable a MIMO (Multiple-Input-Multiple-Output) configuration to augment the entropy further by creating uncorrelated signal paths to obtain multiple backscattered phase data by utilizing multiple antennas in an antenna array, such as various antenna array boards 250 or antennas 260A-260N.

The WPTS 510 can receive the modulated backscatter beacon signal 540 from the wireless power receiver 520 and detect, or otherwise measure, the phase (or direction) from which the signal is received at multiple antennas. In some embodiments, the WPTS 510 can determine the complex conjugate of the measured phase of the modulated backscatter beacon signal 540 and can use the complex conjugate to determine a transmit phase to configure the antennas for delivering or otherwise directing wireless power delivery to the wireless power receiver 520.

Figure 6:
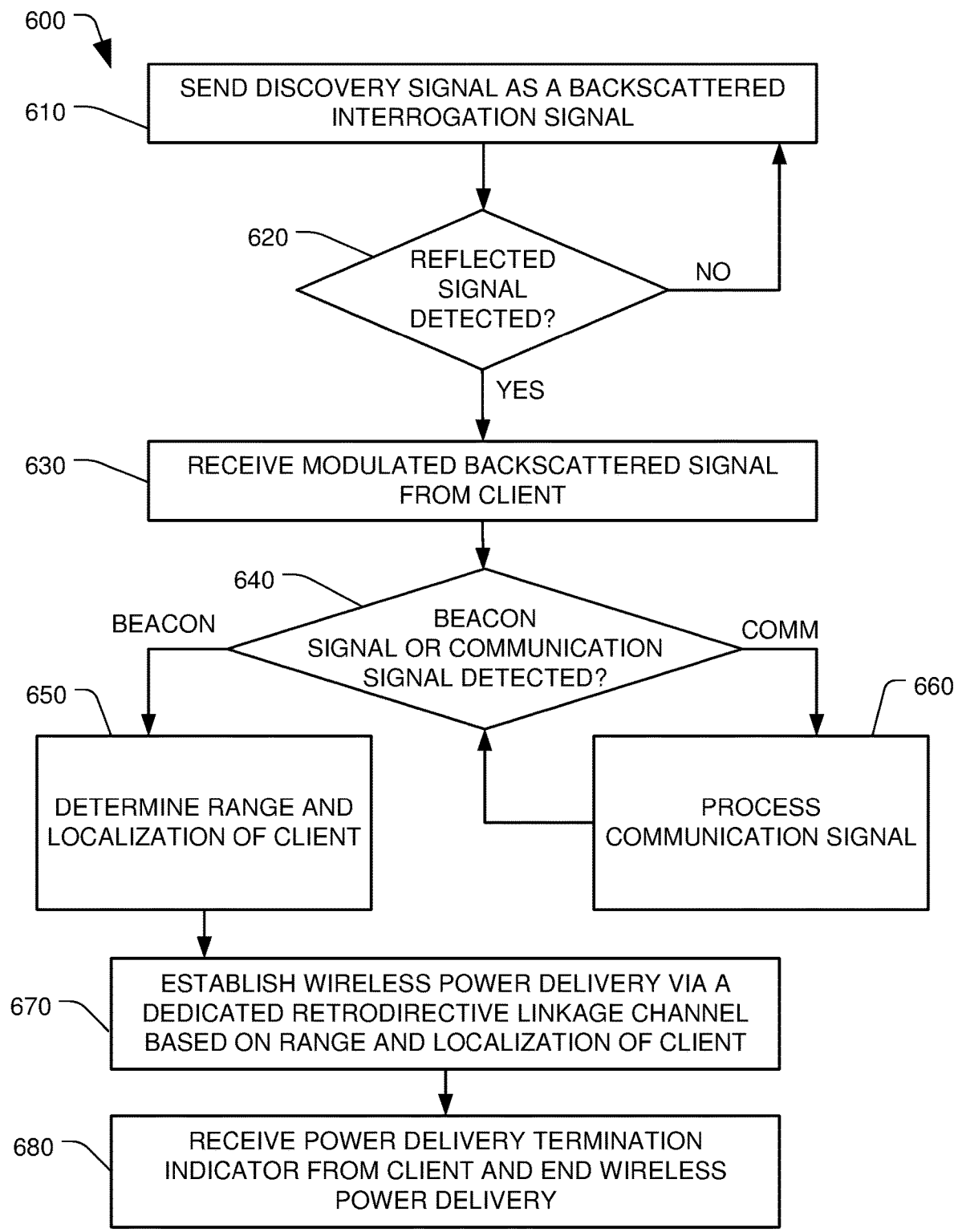
FIG. 6 is a flowchart of a method of operation of a wireless power transmission system, in accordance with certain embodiments of the present disclosure.

FIG. 6 depicts a flowchart of a method of operation of a wireless power receiver, generally designated 600, in accordance with certain embodiments of the present disclosure. Method 600 may be implemented by a transmitting device, such as WPTS 101a-101n, WPTS 200, WPTS 510, or a similar device.

The method 600 may include sending out a discovery signal from a transmitting device. The transmitting device may monitor, via one or more antennas, for a response signal at 620, which may be a modulated backscattered signal received from a wireless power receiver device, at 630.

When a response signal is received, the method 600 may determine whether the response signal is a modulated beacon signal or a modulated communication signal, at 640. When the response signal is a communication signal, the communication signal may be processed, at 660. In some examples, the communication signal can include system level data of the receiver device, such as energy storage level, a client ID, or monitoring data. The method 600 may continue to monitor for a beacon signal, at 640 (or at 620 or 630).

Once a modulated beacon signal is detected, at 640, the method 600 can determine a range and a location of the wireless power receiver device corresponding to the modulated beacon signal, at 650. Once the range and location of the wireless power receiver device are determined, the method 600 can establish wireless power delivery via a dedicated retrodirective linkage channel based on the range and location of the client, at 670. The method 600 can end when an indicator, such as the wireless power receiver sending a termination signal or the transmitting device failing to receive the beacon signal before the expiration of a specific time period, indicates to the transmitting device to end the wireless power delivery to the wireless power receiver device, at 680. Other methods may also be determinative of when to end transmitting the power delivery signal, such as expiration of a time period or a power status indicator received from the receiver device, which could be transmitted via the communication signal.

Figure 7:
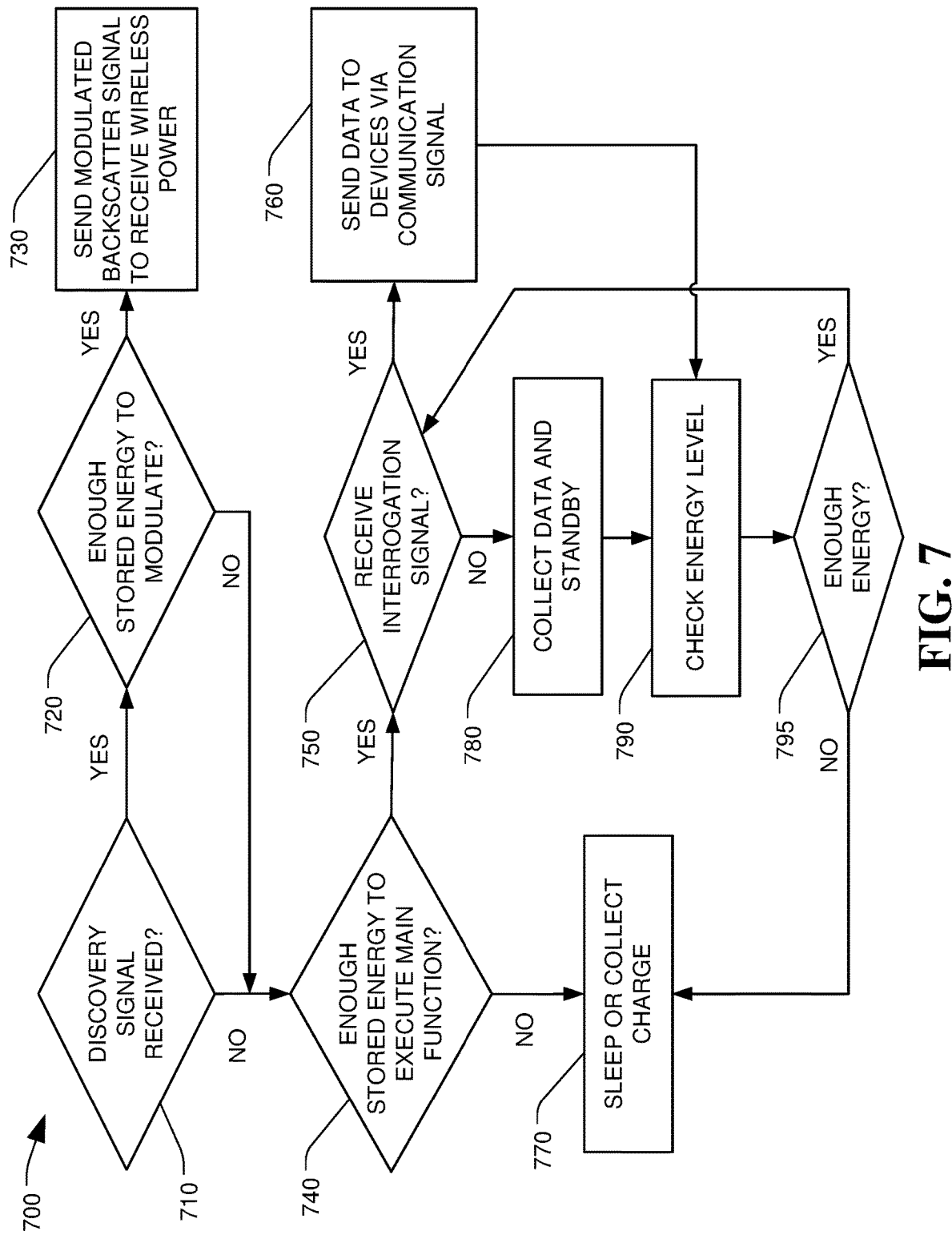
FIG. 7 is a flowchart of a method of operation of a wireless power receiver, in accordance with certain embodiments of the present disclosure.

FIG. 7 depicts a flowchart of a method 700 of operation of a wireless power receiver, in accordance with certain embodiments of the present disclosure. The method may be implemented by a wireless power receiver, such as receivers 103a-103c, receiver 300, circuit 420, receiver 520, or similar circuits or devices. In certain embodiments, the functions and features of method 700 may be implemented by non-integrated circuit devices, such as discrete electronic devices, logic circuits, or a combination thereof.

The method 700 may start when a discovery signal is received at the wireless power receiver, at 710. A discovery signal may be a sent from a transmitter (e.g., base station) that can provide power to activate and communicate with the wireless power receiver.

The method 700 may determine whether there is enough stored energy (such as by using a low-power comparator circuit, which may be within MCU 315, to monitor the voltage of the energy store) to modulate a response signal, at 720, which may be done via MCU 315, backscatter beacon signal generator 330, the frequency division multiplexer circuit 350, or a combination thereof. When there is enough energy stored, the wireless power receiver can send the response signal as a modulated backscatter signal to the discovery signal transmitting device, at 730, which may be done via antenna 360. When received at the transmitting device, the response signal can initialize a process for establishing a link to receive wireless power delivery at the receiver device from the transmitting device, as discussed herein.

When there is not enough energy to modulate a response signal, or when the discovery signal is not received at the receiver, the method 700 may determine whether there is enough stored energy to execute a main function, at 740. When there is enough energy stored to execute the main function, the main function of the device may be performed and the method 700 may determine whether an interrogation signal has been or is being received, at 750. When the interrogation signal is received, data may be sent to devices via a communication signal, at 760, such as described herein. The interrogation signal can be a pulse interval modulated signal, which can be a very low-level modulation of an interrogation signal. In some embodiments, the discovery signal, at 710, and the interrogation signal, at 750, may be the same signal; however, they may be independent signals in other embodiments. When the interrogation signal is not received, at 750, the method 700 can collect data and standby, at 780, and check the energy level, at 790. In various embodiments, an energy store level can be checked at various times such as before or after various functions, (e.g., with respect to 720, 740, 760, 780, 790, or any combination thereof). The standby function can include putting circuitry or a processor unit into a low power mode, such as to utilize a minimum amount of energy without losing memory.

As long as there is enough energy, at 795, the main function can continue to be executed. The system may also continue to check for whether an interrogation signal is received, at 750, such as to determine when a base device is requesting data from a received device. When there is not enough energy to execute a main function, at 740 or at 795, the method 700 may enter a sleep mode, collect charge (e.g., passively collect power), or both, at 770. A sleep mode may include shutting down power to one or more circuits within the receiver device, and can include shutting down power to all circuits within the receiver device. When in a sleep mode, the method 700 may be awakened when a discovery signal is received, at 710, which can activate the system by providing power to the circuit(s).

Figure 8:
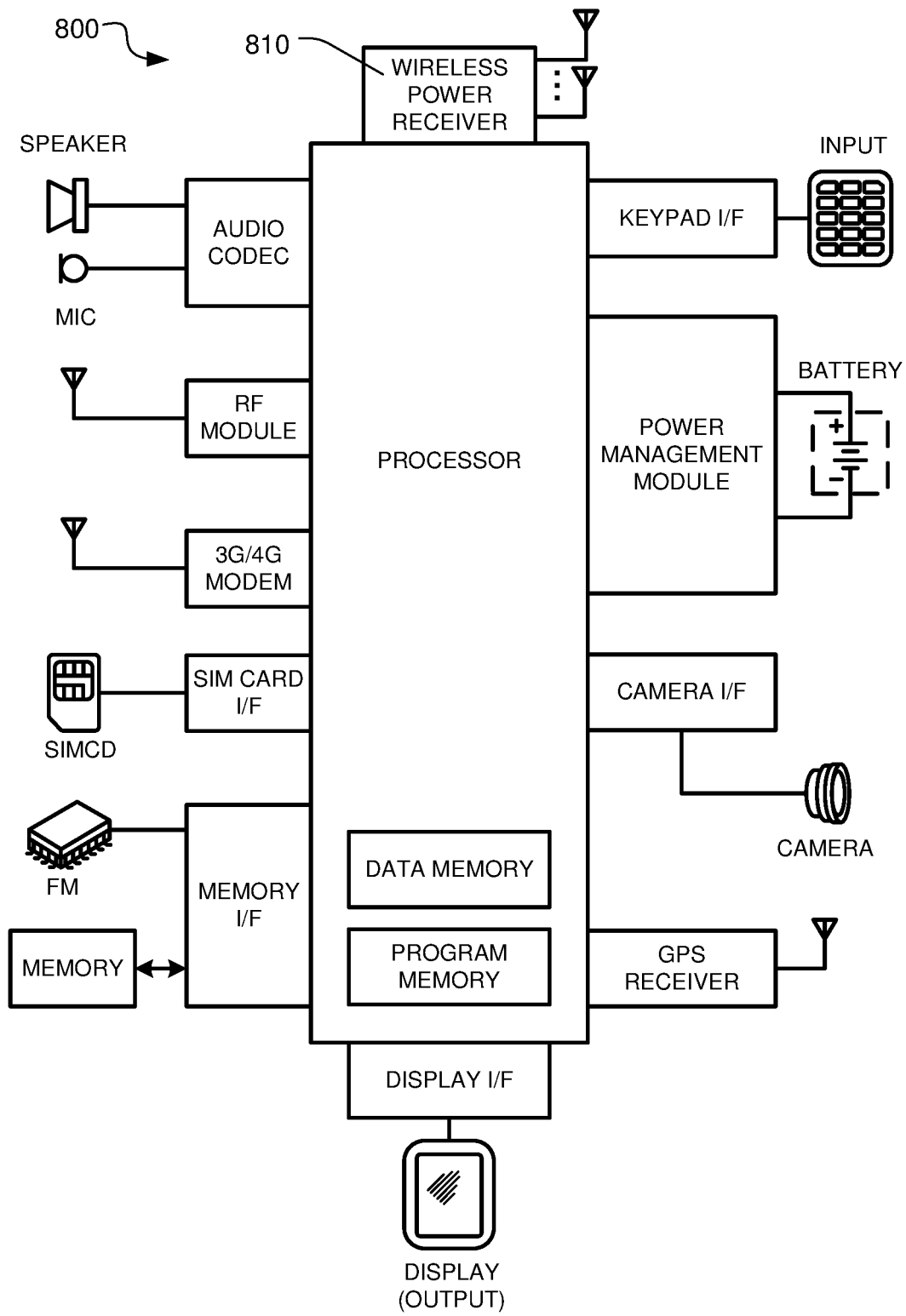
FIG. 8 is a block diagram of a mobile computing device with a wireless power receiver, in accordance with certain embodiments of the present disclosure.

FIG. 8 depicts a block diagram of a computing device 800 with a wireless power receiver 810, in accordance with certain embodiments of the present disclosure. Computing device 800 includes any form of a computer with a wireless power receiver 810, such as a mobile (or smart) phone, tablet computer device, desktop computer device, laptop computing device, wearable computing device, or any other computing device for which wireless power charging could be applicable, in accordance with various embodiments herein. The wireless power receiver 810 may be implemented as the clients 103a-103c, client 300, circuit 420, receiver 520, or any combination thereof. Further, wireless power receiver 810 may execute and perform any of the wireless power receiver methods and functions described herein.

Various interfaces and modules are shown in or coupled to the computing device 800; however, computing device 800 does not require all of such modules or functions for performing the functionality described herein. It is appreciated that, in many embodiments, various components are not included or necessary for operation of the respective computing device. For example, components such as global positioning system (GPS) radios, cellular radios, SIM cards, cameras, and accelerometers, as well as other components, may not be included in some implementations of a computing device. Further, one or more of the components or modules shown may be combined or removed.

For example, with the wireless power receiver 810 implemented, the battery, power management module, or both may be redundant in some embodiments, such as if all power management functions for the computing device 800 are built into the wireless power receiver 810. Further, a battery might not be necessary in embodiments that receive constant power via the wireless power receiver 810.

The embodiments described herein eliminate RF transceiver/receiver chips (integrated circuits acting as a receiver or transceiver) from the receiver architectures for wirelessly powered devices, which allows a significant reduction in size, weight, power, and cost; such can be beneficial to many Internet-of-Things applications, as well as inventory tracking. Further, the embodiments enable phase data extraction from a backscattering beacon signal which can be used for range determination and localization of the beacon transmitting receiver.

Using the backscattered interrogation signal (created by a wireless power delivery transmitter), a wireless power receiver can generate the beacon signal without the need of any transceiver integrated circuits. The same solution can be also used for realizing a communication signal (such as BLE), which can be done over the same transmitter and receiver by frequency multiplexing. As such, without any active transceiver components consuming power in the wireless power receiver, both beaconing for such architecture and communication can be realized. In addition, the phase of the backscattered beacon signal can be recorded by the wireless power delivery transmitter and can be used to determine the range and the location of the client (localization). In some embodiments, the frequency multiplexing of power harvesting and communication signals can allow interference-free operation of the proposed communication node while providing highly reliable wireless power delivery.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments can be made, and other embodiments not specifically described herein will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A wireless power receiver comprising:
   a control circuit;
   a wireless power receiver circuit operably coupled to the control circuit and operably couplable to at least one antenna, wherein the wireless power receiver circuit is configured to receive radio frequency (RF) signals from a wireless power transmitter system (WPTS), wherein the wireless power receiver circuit includes a signal generator circuit, and wherein the RF signals include a discovery or interrogation signal; and
   a power harvester circuit operably coupled to the control circuit and operably couplable to the at least one antenna and to an energy storage device, wherein the power harvester circuit is configured to:
      monitor for detection of the discovery or interrogation signal; and
      harvest electric power from the discovery or interrogation signal for storage in the energy storage device,
   wherein the control circuit is configured to:
      determine that there is sufficient electric power harvested from the discovery or interrogation signal by the power harvester circuit to operate the signal generator circuit; and
      in response to it being determined that there is sufficient electric power harvested from the discovery or interrogation signal by the power harvester circuit to operate the signal generator circuit, cause the signal generator circuit to:
         in response to the discovery or interrogation signal being received by the wireless power receiver circuit, modulate the discovery or interrogation signal to produce a modulated backscattered signal, and
   wherein the wireless power receiver circuit includes:
      a communication signal generator circuit operably coupled to the control circuit and operably couplable to the at least one antenna, the communication signal generator circuit configured to generate a data communication signal based on data available at the wireless power receiver circuit; and
      a frequency multiplexer circuit configured to frequency multiplex the modulated backscattered signal and the data communication signal to generate a frequency multiplexed signal for transmission to the WPTS,
      wherein the signal generator circuit includes an output configured to provide the frequency multiplexed signal to the at least one antenna for transmission to the WPTS.

2. The wireless power receiver of claim 1, wherein the signal generator circuit includes a modulation circuit configured to modulate the discovery or interrogation signal to produce the modulated backscattered signal.

3. The wireless power receiver of claim 1, wherein the signal generator circuit includes a microcontroller unit (MCU), and wherein the control circuit is further configured to determine that there is sufficient electric power harvested from the discovery or interrogation signal by the power harvester circuit to operate the MCU.

4. The wireless power receiver of claim 3, wherein the signal generator circuit further includes an RF switch, and wherein the control circuit is further configured to:
   in response to it being determined that there is sufficient electric power harvested from the discovery or interrogation signal by the power harvester circuit to operate the MCU, cause the MCU to provide control signals to the RF switch to generate the modulated backscattered signal.

5. The wireless power receiver of claim 1 further comprising at least one of:
the at least one antenna operably coupled to the wireless power receiver circuit; and
the energy storage device operably coupled to the power harvester circuit.

6. The wireless power receiver of claim 1, wherein the RF signals further include a wireless power signal, and wherein the wireless power receiver circuit further includes an input configured to receive the wireless power signal from the WPTS in response to the frequency multiplexed signal being transmitted to the WPTS.

7. The wireless power receiver of claim 1, wherein the at least one antenna includes a dual-band antenna configured to:
receive the frequency multiplexed signal;
transmit the modulated backscattered signal on a first frequency; and
transmit the data communication signal on a second frequency different from the first frequency.

8. The wireless power receiver of claim 1 further comprising a memory storage device operably coupled to the wireless power receiver circuit and configured to:
store a unique identifier of the wireless power receiver; and
accumulate the data available at the wireless power receiver circuit during such times that the discovery or interrogation is not being received from the WPTS.

9. The wireless power receiver of claim 8, wherein the control circuit is further configured to determine that there is sufficient electric power harvested from the discovery or interrogation signal by the power harvester circuit to operate the communication signal generator circuit.

10. The wireless power receiver of claim 9, wherein, in response to it being determined that there is sufficient electric power harvested from the discovery or interrogation signal by the power harvester circuit to operate the communication signal generator circuit, the control circuit is further configured to:
in response to the discovery or interrogation signal being received by the wireless power receiver circuit, generate a communications signal encoding data representative of the data available at the wireless power receiver circuit and the unique identifier.

11. The wireless power receiver of claim 10, wherein, further in response to the discovery or interrogation signal being received by the wireless power receiver circuit, the control circuit is further configured to transmit the communications signal to the WPTS via the at least one antenna.

12. The wireless power receiver of claim 1, wherein the wireless power receiver circuit is further configured to receive, via the at least one antenna, a wireless power signal from the WPTS in response to the frequency multiplexed signal being transmitted.

13. A method in a wireless power receiver, the method comprising:
receiving, by a wireless power receiver circuit of the wireless power receiver and via at least one radio frequency (RF) antenna, a discovery or interrogation signal from a wireless power transmission system (WPTS);
monitoring, by a power harvester circuit of the wireless power receiver, for detection of the discovery or interrogation signal;
harvesting, by the power harvester circuit, electric power from the discovery or interrogation signal for storage in an energy storage device;
determining, by a control circuit of the wireless power receiver, that there is sufficient electric power harvested from the discovery or interrogation signal by the power harvester circuit to operate a signal generator circuit of the wireless power receiver;
in response to determining that there is sufficient electric power harvested from the discovery or interrogation signal by the power harvester circuit to operate the signal generator circuit:
modulating, by the signal generator circuit, the discovery or interrogation signal to produce a modulated backscattered signal in response to receiving the discovery or interrogation signal;
generating, by a communication signal generator circuit of the wireless power receiver, a data communication signal based on data available at the wireless power receiver circuit;
multiplexing, by a frequency multiplexer circuit of the wireless power receiver, the modulated backscattered signal and the data communication signal to generate a frequency multiplexed signal; and
transmitting, by the signal generator circuit, the frequency multiplexed signal to the WPTS via the at least one RF antenna.

14. The method of claim 13, wherein modulating the discovery or interrogation signal comprises modulating the discovery or interrogation signal using a modulation circuit of the signal generator circuit to produce the modulated backscattered signal, and wherein transmitting the frequency multiplexed signal to the WPTS comprises providing the frequency multiplexed signal to the at least one RF antenna by way of an output of the signal generator circuit.

15. The method of claim 13, wherein the signal generator circuit includes a microcontroller unit (MCU), the method further comprising determining that there is sufficient electric power harvested from the discovery or interrogation signal by the power harvester circuit to operate the MCU.

16. The method of claim 15, wherein the signal generator circuit further includes an RF switch, the method further comprising:
in response to determining that there is sufficient electric power harvested from the discovery or interrogation signal by the power harvester circuit to operate the MCU, providing, by the MCU, control signals to the RF switch to facilitate generating the modulated backscattered signal.

17. The method of claim 13, wherein the at least one RF antenna includes a dual-band antenna, the method further comprising:
receiving, by the dual-band antenna, the frequency multiplexed signal from an output of the signal generator circuit;
transmitting, by the dual-band antenna, the modulated backscattered signal on a first frequency; and
transmitting, by the dual-band antenna, the data communication signal on a second frequency different from the first frequency.

18. The method of claim 13 further comprising:
storing a unique identifier of the wireless power receiver in a memory storage device;
accumulating the data available at the wireless power receiver circuit during such times that the discovery or interrogation is not being received from the WPTS; and
determining that there is sufficient electric power harvested from the discovery or interrogation signal by the power harvester circuit to operate the communication signal generator circuit, wherein generating the data communication signal comprises:
in response to determining that there is sufficient electric power harvested from the discovery or interrogation signal by the power harvester circuit to operate the communication signal generator circuit:
generating, in response to receiving the discovery or interrogation signal, the communications signal encoding data representative of the data available at the wireless power receiver circuit and the unique identifier; and
transmitting the communications signal to the WPTS via the at least one RF antenna.

19. The method of claim 13 further comprising receiving, by the wireless power receiver circuit and via the at least one RF antenna, a wireless power signal from the WPTS in response to transmitting the frequency multiplexed signal.

20. The method of claim 19, wherein receiving the wireless power signal from the WPTS comprises receiving the wireless power signal from the WPTS further via an input of the wireless power receiver circuit.

21. One or more non-transitory computer readable media having stored thereon program instructions which, when executed by at least one processor, cause a wireless power receiver to:
direct a wireless power receiver circuit to receive, via at least one radio frequency (RF) antenna, a discovery or interrogation signal from a wireless power transmission system (WPTS);
direct a power harvester circuit to monitor for detection of the discovery or interrogation signal;
direct the power harvester circuit to harvest electric power from the discovery or interrogation signal for storage in an energy storage device;
direct a control circuit to determine that there is sufficient electric power harvested from the discovery or interrogation signal by the power harvester circuit to operate a signal generator circuit of the wireless power receiver;
in response to it being determined that there is sufficient electric power harvested from the discovery or interrogation signal by the power harvester circuit to operate the signal generator circuit:
direct the signal generator circuit to modulate the discovery or interrogation signal to produce a modulated backscattered signal in response to the discovery or interrogation signal being received;
direct a communications signal generator circuit to generate a data communication signal based on data available at the wireless power receiver circuit;
direct a frequency multiplexer circuit to multiplex the modulated backscattered signal and the data communication signal to generate a frequency multiplexed signal; and
direct the signal generator circuit to transmit the frequency multiplexed signal to the WPTS via the at least one RF antenna; and
direct the wireless power receiver circuit to receive, via the at least one RF antenna, a wireless power signal from the WPTS in response to the frequency multiplexed signal being transmitted.

* * * * *

UNITED STATES PATENT AND TRADEMARK OFFICE
CERTIFICATE OF CORRECTION

| | |
|---|---|
| PATENT NO. | : 11,824,370 B2 |
| APPLICATION NO. | : 17/951573 |
| DATED | : November 21, 2023 |
| INVENTOR(S) | : Cosan Caglayan et al. |

It is certified that error appears in the above-identified patent and that said Letters Patent is hereby corrected as shown below:

In the Claims

Column 15, Claim 8, Line 28, after "interrogation" insert --signal--

Column 16, Claim 18, Line 63, after "interrogation" insert --signal--

Signed and Sealed this
Fourteenth Day of May, 2024

Katherine Kelly Vidal
*Director of the United States Patent and Trademark Office*